(12) United States Patent
Toolan et al.

(10) Patent No.: US 11,116,180 B2
(45) Date of Patent: Sep. 14, 2021

(54) PET TOY

(71) Applicant: Benebone LLC, Westport, CT (US)

(72) Inventors: Peter Toolan, Westport, CT (US); Evan L. Ryan, Highland Park, IL (US)

(73) Assignee: Benebone LLC, Westport, CT (US)

( * ) Notice: Subject to any disclaimer, the term of this patent is extended or adjusted under 35 U.S.C. 154(b) by 516 days.

(21) Appl. No.: 15/924,966

(22) Filed: Mar. 19, 2018

(65) Prior Publication Data

US 2018/0271062 A1   Sep. 27, 2018

Related U.S. Application Data

(60) Provisional application No. 62/474,496, filed on Mar. 21, 2017.

(51) Int. Cl.
*A01K 15/02* (2006.01)

(52) U.S. Cl.
CPC .................. *A01K 15/026* (2013.01)

(58) Field of Classification Search
CPC .. A01K 15/025; A01K 15/026; A01K 5/0114; A01K 15/02
USPC .......................................... 119/707, 709, 710
See application file for complete search history.

(56) References Cited

U.S. PATENT DOCUMENTS

| D256,503 | S | 8/1980 | Moustakas |
|---|---|---|---|
| D256,958 | S | 9/1980 | Markham |
| 4,802,444 | A | 2/1989 | Markham et al. |
| D307,339 | S | 4/1990 | Markham et al. |
| D308,122 | S | 5/1990 | Markham et al. |
| RE34,352 | E | 8/1993 | Markham |
| D344,161 | S | 2/1994 | Markham |
| D349,786 | S | 8/1994 | Markham |
| D373,859 | S | 8/1996 | Markham et al. |
| 5,640,931 | A | 6/1997 | Markham |
| 5,813,366 | A | 9/1998 | Mauldin, Jr. |
| 5,832,877 | A | 11/1998 | Markham |
| 5,865,146 | A | 2/1999 | Markham |
| 5,904,118 | A | 5/1999 | Markham |
| 5,947,061 | A | 9/1999 | Markham et al. |

(Continued)

OTHER PUBLICATIONS

Nov. 7, 2016 Pet Dog Cat Play Chew Treat Holder accessed from www.aliexpress.com original publication date unknown.

(Continued)

*Primary Examiner* — Peter M Poon
*Assistant Examiner* — Jeffrey R Larsen
(74) *Attorney, Agent, or Firm* — Zollinger & Burleson Ltd.

(57) ABSTRACT

A pet toy holds another item that can be chewed upon by a pet. The pet toy holds the item with a flexible retainer disposed within and protected by a central hub. The central hub can be provided with different external shapes including a round ball shape, an oval football shape, a flattened frisbee shape, an elongated bone shape, or a star shape with a plurality of arms. The central hub is configured to secure the retainer and protect the retainer from damage from the pet during use. The retainer can be a plurality of flexible fingers. The pet toy can have a plurality of arms projecting from the central hub. The central hub extends both above and below the arms to allow the pet to firmly hold the toy against the ground in a secure arrangement for both chewing on an arm of the pet toy and for chewing on a chew toy or edible item held by the pet toy.

17 Claims, 15 Drawing Sheets

(56) References Cited

U.S. PATENT DOCUMENTS

| | | | |
|---|---|---|---|
| 6,129,053 A | 10/2000 | Markham et al. | |
| 6,186,096 B1 | 2/2001 | Miller | |
| 6,217,408 B1 | 4/2001 | Willinger | |
| D442,343 S | 5/2001 | Flynn | |
| D453,292 S | 2/2002 | Tsuzuki | |
| 6,439,166 B1 | 8/2002 | Markham | |
| 6,526,912 B1 | 3/2003 | Ottoson | |
| 6,546,896 B1 | 4/2003 | Markham | |
| D501,961 S | 2/2005 | Jager | |
| 6,990,927 B2 | 1/2006 | Axelrod | |
| D534,694 S | 1/2007 | Pozzoni | |
| D540,496 S | 4/2007 | Axelrod | |
| 7,201,117 B2 | 4/2007 | Ritchey et al. | |
| D542,506 S | 5/2007 | Springer | |
| 7,270,085 B2 | 9/2007 | Wolfe, Jr. et al. | |
| 7,343,878 B2 | 3/2008 | Ritchey et al. | |
| 7,363,880 B2 | 4/2008 | Ritchey et al. | |
| 7,389,748 B2 | 6/2008 | Shatoff et al. | |
| D579,157 S | 10/2008 | Edwards | |
| 7,455,033 B2 | 11/2008 | Curry | |
| D587,411 S | 2/2009 | Rezny | |
| 7,500,450 B2 | 3/2009 | Wolfe, Jr. et al. | |
| 7,555,997 B2 | 7/2009 | Wolfe, Jr. et al. | |
| 7,591,234 B2 | 9/2009 | Shatoff et al. | |
| 7,665,423 B2 | 2/2010 | Ritchery et al. | |
| D614,365 S | 4/2010 | Watson et al. | |
| D624,711 S | 9/2010 | Shatoff et al. | |
| D636,949 S | 4/2011 | Axelrod et al. | |
| D642,342 S | 7/2011 | Shatoff et al. | |
| 8,033,253 B2 | 10/2011 | Ritchey et al. | |
| 8,087,387 B2 | 1/2012 | Gamble et al. | |
| 8,141,521 B2 | 3/2012 | Shatoff et al. | |
| D657,471 S | 4/2012 | Chin et al. | |
| D657,919 S | 4/2012 | Papworth | |
| D658,817 S | 5/2012 | Costello et al. | |
| D658,825 S | 5/2012 | Wolfe, Jr. et al. | |
| D664,723 S | 7/2012 | Wolfe, Jr. et al. | |
| 8,225,747 B2 | 7/2012 | Markham et al. | |
| 8,276,547 B2 | 10/2012 | Markham | |
| 8,322,308 B2 | 12/2012 | Curry et al. | |
| 8,342,132 B2 | 1/2013 | Markham | |
| 8,342,133 B2 | 1/2013 | Markham | |
| 8,424,489 B2 | 4/2013 | Desrosiers | |
| 8,468,977 B2 | 6/2013 | Markham | |
| 8,474,404 B2 | 7/2013 | Costello | |
| D688,836 S | 8/2013 | Costello | |
| D690,897 S | 10/2013 | Toolan et al. | |
| D700,755 S | 3/2014 | Reiss et al. | |
| D708,818 S | 7/2014 | Axelrod et al. | |
| 8,776,729 B2 | 7/2014 | Koo et al. | |
| D712,602 S | 9/2014 | Chen et al. | |
| 8,904,967 B2 | 12/2014 | Reiss et al. | |
| D722,730 S | 2/2015 | Simon et al. | |
| 8,978,590 B2 | 3/2015 | Nunn et al. | |
| D746,018 S | 12/2015 | Axelrod et al. | |
| D751,258 S | 3/2016 | Setser | |
| 9,282,724 B2 | 3/2016 | Nunn | |
| 9,301,496 B2 | 4/2016 | Reiss et al. | |
| D755,446 S | 5/2016 | Hansen | |
| D756,044 S | 5/2016 | Anderson | |
| 9,345,234 B2 | 5/2016 | Curry et al. | |
| D760,964 S | 7/2016 | Toolan | |
| 9,635,837 B2 | 5/2017 | Simon | |
| D798,219 S | 9/2017 | Xiao | |
| D811,018 S | 2/2018 | Toolan | |
| 9,901,075 B2 | 2/2018 | Wolfe, Jr. et al. | |
| D812,320 S | 3/2018 | Stone | |
| D818,214 S | 5/2018 | Toolan et al. | |
| D840,610 S | 2/2019 | Toolan et al. | |
| D894,503 S | 8/2020 | Toolan et al. | |
| 2005/0039696 A1 | 2/2005 | Springer | |
| 2006/0102099 A1* | 5/2006 | Edwards | A01K 15/026 |
| | | | 119/710 |
| 2007/0015100 A1 | 1/2007 | Morris | |
| 2008/0029045 A1 | 2/2008 | Willinger | |
| 2008/0141948 A1 | 6/2008 | Renforth et al. | |
| 2011/0139815 A1 | 6/2011 | Benson | |
| 2012/0125267 A1 | 5/2012 | Kelly | |
| 2012/0152180 A1* | 6/2012 | McCann | A01K 5/0114 |
| | | | 119/707 |
| 2014/0130750 A1 | 5/2014 | Valle et al. | |
| 2014/0209038 A1 | 7/2014 | Simon | |
| 2015/0040837 A1 | 2/2015 | Axelrod et al. | |
| 2015/0373950 A1* | 12/2015 | Spring | A23K 20/28 |
| | | | 119/710 |
| 2016/0081305 A1 | 3/2016 | Williams et al. | |
| 2016/0165845 A1 | 6/2016 | Stone | |
| 2016/0255812 A1 | 9/2016 | Wolfe, Jr. et al. | |
| 2016/0309682 A1 | 10/2016 | Stone | |
| 2017/0118957 A1 | 5/2017 | Nunn | |

OTHER PUBLICATIONS

"Introducing the Pawplexer" Page dated Nov. 13, 2017 Retrieved from http://www.benebone.com/blog/introducing-pawplexer.

"Kong Puppy Goodie Bones" Page dated Jan. 31, 2011 Retrieved from https://www.amazon.ca/Kong-Puppy-Goodie-Bones-Blue/dp/B0009VKK9G/ref=pd_sim_199_4?_encoding=UTF8&psc=1&refRID=SZXQ9HGEXTH7MHJGJRDD.

"West Paw Zogoflex Hurley Durable Dog Bone Chew Toy for Aggressive Chewers" Page dated Oct. 24, 2012. Retrieved from https://www.amazon.ca/West-Paw-Zogoflex-Aggressive-Guaranteed/dp/B004A7X21I/ref=sr_1_1?ie=UTF8&qid=1522427705&sr=8-1&keywords=west+paw+zogoflex+hurley.

"Kong Genius Leo Dog Toy" Page dated Oct. 25, 2010. Retrieved from https://www.amazon.ca/Kong-Genius-Large-Colors-vary/dp/B003JVLZYC/ref=sr_1_1?s=pet-supplies&ie=UTF8&qid=1522427874&sr=1-1&keywords=kong+genius+leo.

Bully Grip(R), PO Box 2792, Granite Bay, CA 95746, https://bullygrip.com/ screen image copyright 2018, accessed Sep. 24, 2020.

BarkShop, Bark, Poor Yorick's Skull, https://barkshop.com/products/poor-yoricks-skull, screen image, accessed Sep. 24, 2020.

* cited by examiner

PET TOY

CROSS REFERENCE TO RELATED APPLICATIONS

This application claims the benefit of U.S. Provisional Patent Application No. 62/474,496 filed Mar. 21, 2017; the disclosure of which is incorporated herein by reference.

BACKGROUND OF THE DISCLOSURE

1. Technical Field

The disclosure relates to toys for pets and, more particularly toys related to chewing. Specifically, the disclosure relates to a multiple-purpose pet toy that can function as a chew toy itself, a holder for a chew toy or edible item, a throwable fetching toy, and a tug of war toy.

2. Background Information

A wide variety of pet toys exist in the art and many of these are designed for chewing by the pet. One category of these toys are designed to be chewed upon but not ingested. Some of these are fabricated from a tough polymer such as nylon combined with other materials or flavoring. These types of toys last through multiple rounds of aggressive chewing by a large dog and are provided in a wide variety of shapes. Another category is designed to be ingested by the animal. These include bully sticks, hard cheese chews, and fish skins. Dogs prefer these items to be elongated so that one end can be held by the paws with the other end projecting up which the dog can chew.

SUMMARY OF THE DISCLOSURE

The disclosure provides a pet toy that is configured for multiple uses. The pet toy can be used as a throwable fetching toy, a tug of war toy, a chew toy, and a holder for other chew toys or edible items.

The disclosure provides a pet toy configuration that holds another item that can be chewed upon by a pet. For instance, the pet toy of the disclosure may hold an elongated item that is chewed upon by a dog. The pet toy of the disclosure holds the item with a flexible retainer disposed within and protected by a central hub. The central hub can be provided with different external shapes including a round ball shape, an oval football shape, a flattened frisbee shape, an elongated bone shape, or a star shape with a plurality of arms. The central hub is configured to secure the retainer and protect the retainer from damage from the pet during use.

The disclosure provides a configuration of the pet toy that has a plurality of arms projecting from a central hub that supports a retainer such as plurality of resilient fingers that define a holder for the other chew toy or edible item. The arms and hub are configured to be a chew toy of their own and are thus fabricated from a tough material that can be chewed by an aggressive-chewing pet with for a long time. The material can be flavored. The material and the toy are not intended to be edible themselves.

The disclosure provides a configuration of the pet toy that has a plurality of arms projecting from a central hub that supports a flexible retainer in the form of a plurality of resilient fingers that define a holder for the other chew toy. The central hub extends both above and below the arms to allow the pet to firmly hold the toy against the ground in a secure arrangement for both chewing on an arm of the pet toy and for chewing on a chew toy or edible item held by the pet toy. The pet can push down on at least arm with a paw and tilt the toy against the ground to angle the device being held by the retainer at an angle desirable for chewing.

The disclosure provides a configuration of the pet toy that has a plurality of arms projecting from a central hub that supports a flexible retainer in the form of a plurality of resilient fingers that define a holder for the other chew toy or edible item. The central hub extends both above and below the arms to provide protection for the resilient fingers so that the pet using the toy cannot easily access these fingers and pry them loose from the central hub. The disclosure also provides different configurations for securing the resilient fingers to the central hub.

The disclosure provides a configuration of the pet toy that has a plurality of arms projecting from a central hub wherein the arms define a series of parallel ribs (defined by indentations into the arms) that provide grip for a pet's claws while also providing desirable chewing surfaces and structures.

The preceding non-limiting aspects, as well as others, are more particularly described below. A more complete understanding of the device and how it operates can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

Similar numbers refer to similar parts throughout the specification.

DETAILED DESCRIPTION OF THE DISCLOSURE

Figure 13:
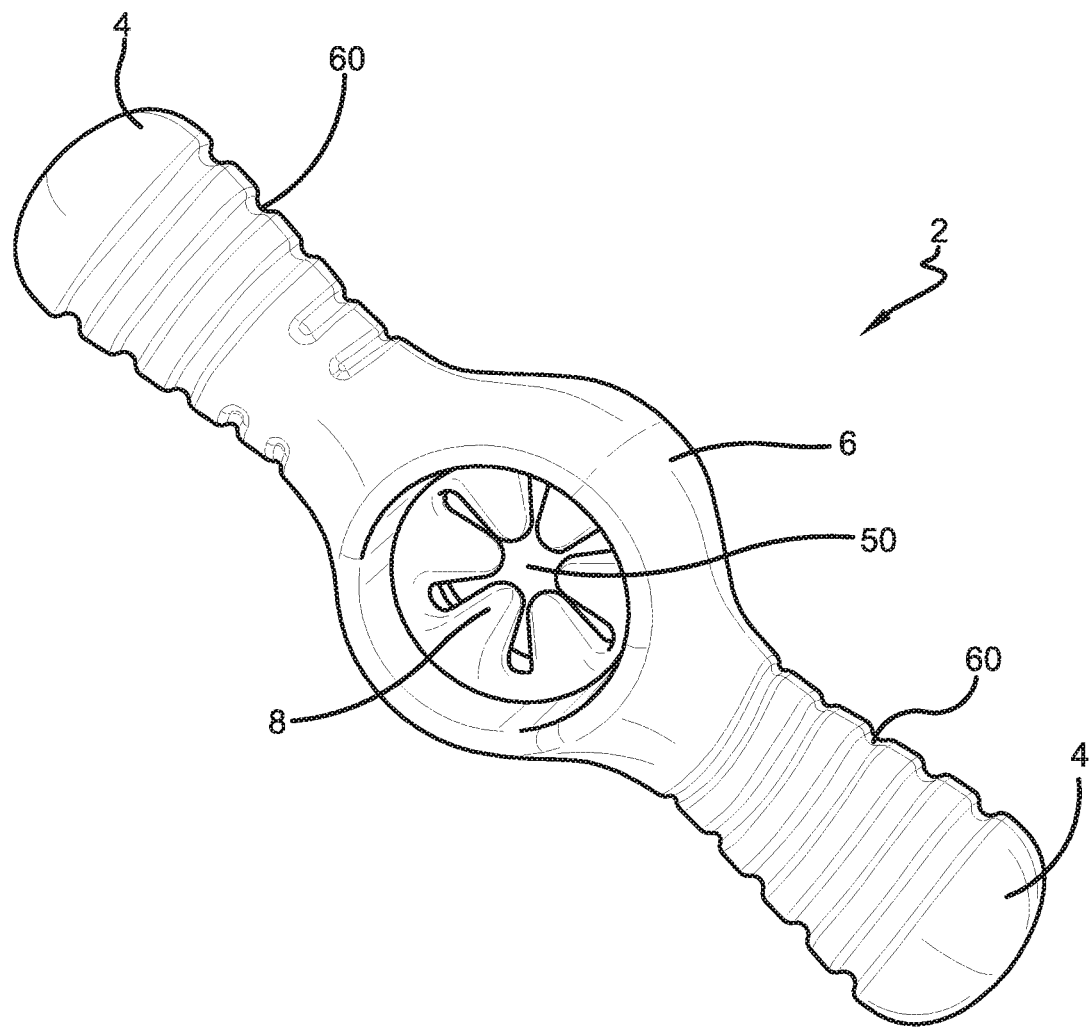
FIG. 13 is a perspective view of another exemplary configuration for the pet toy.
Figure 14:
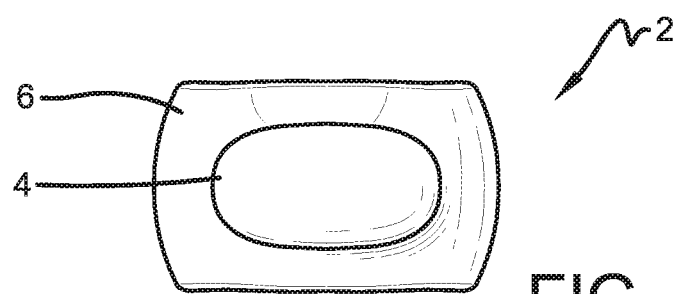
FIG. 14 is a front elevation view of FIG. 13 showing the outer wall of the central hub extending both above and below the arms.
Figure 15:
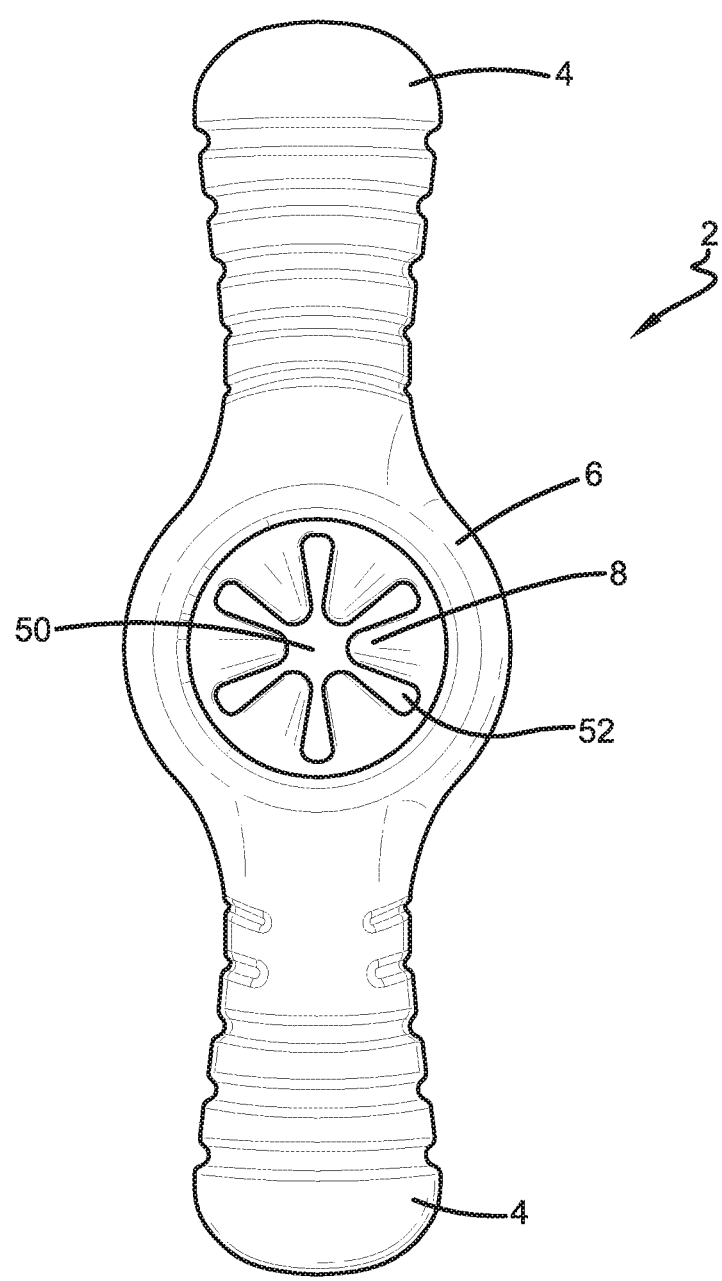
FIG. 15 is a top plan view of FIG. 13.
Figure 17:
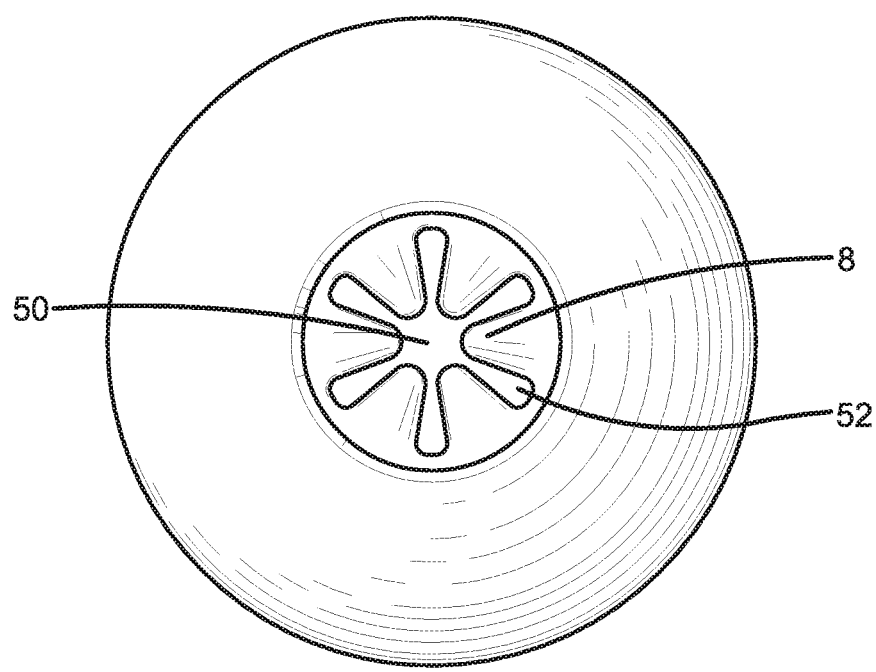
FIG. 17 is a top plan view showing an alternative configuration for the pet toy of the disclosure.
Figure 18:
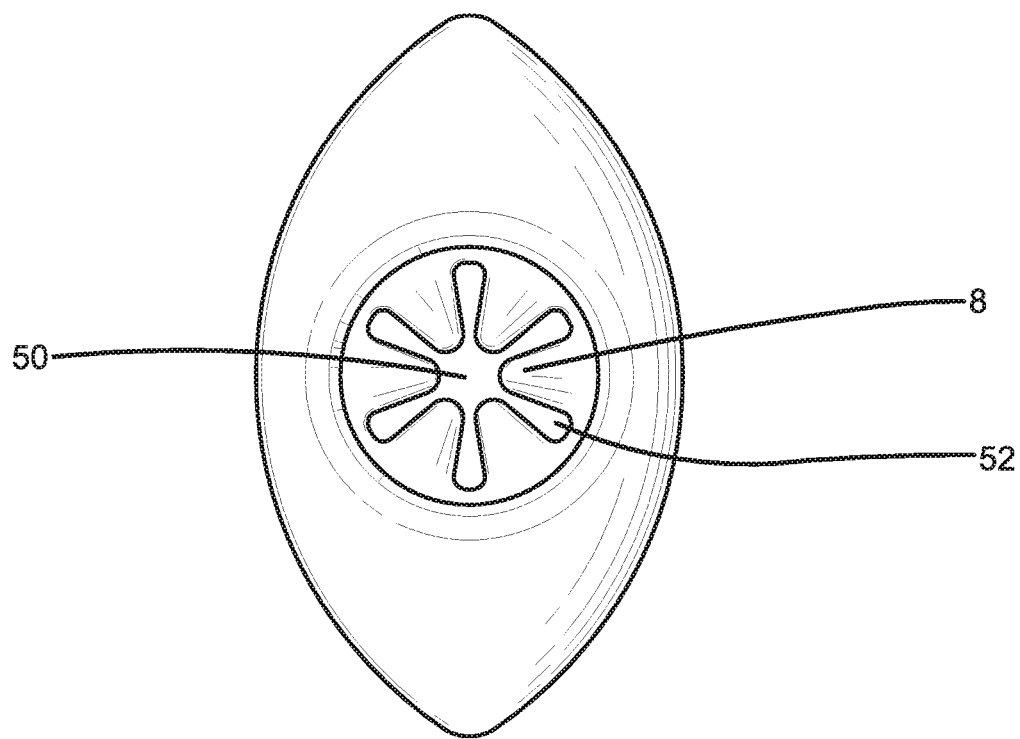
FIG. 18 is a top plan view showing an alternative configuration for the pet toy of the disclosure.
Figure 19:
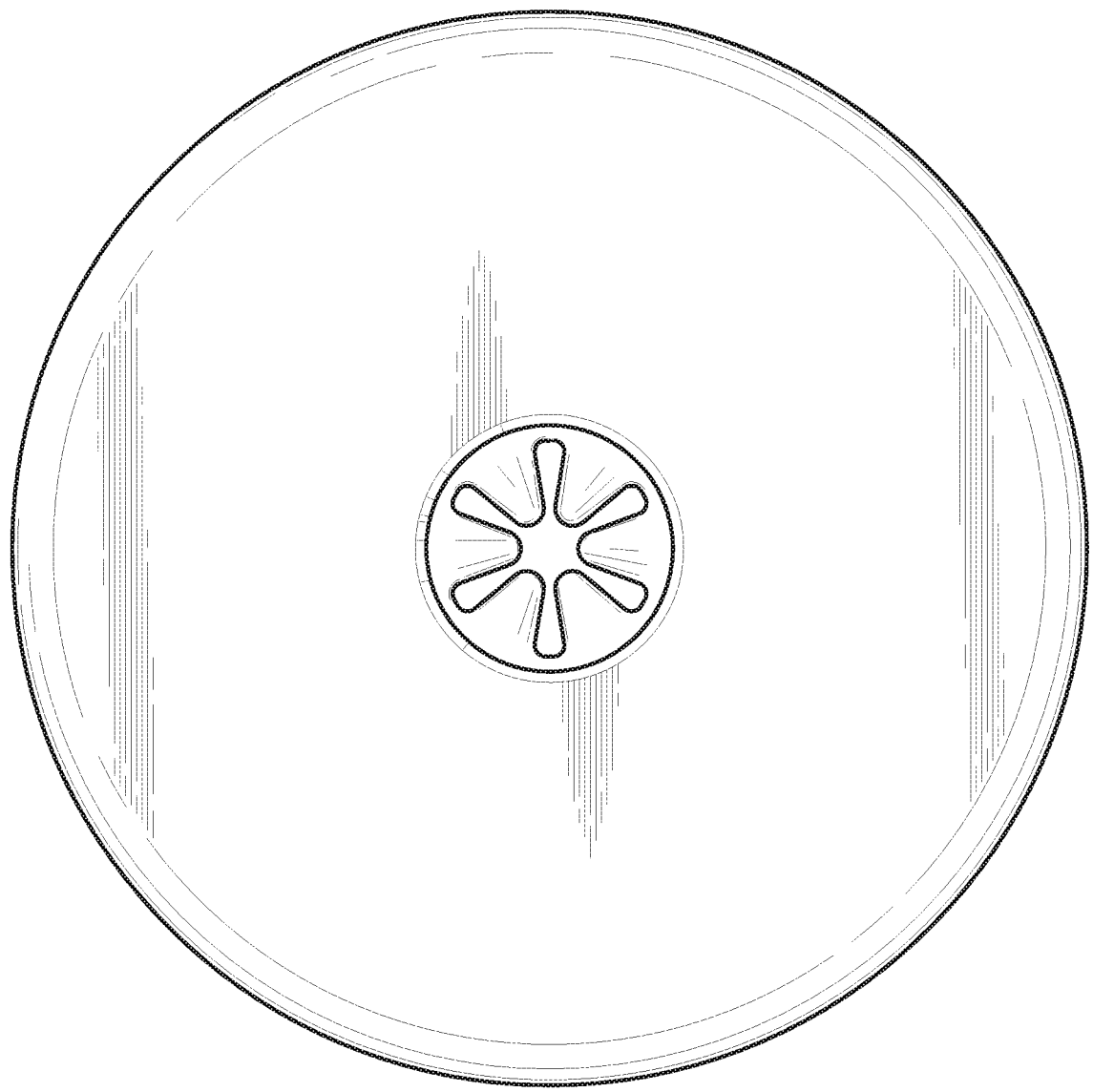
FIG. 19 is a top plan view showing an alternative configuration for the pet toy of the disclosure.

The different exemplary configurations of the pet toys described herein are indicated generally by the reference numeral 2 in the accompanying drawings. FIGS. 1-11 disclose a first exemplary configuration, FIG. 12 discloses a second exemplary configuration, and FIGS. 13-15 disclosure a third exemplary configuration. Additional configurations are depicted in FIGS. 17-19. The features unique to each configuration can be interchanged with the other features of these configurations to provide additional configurations. For example, the resilient fingers of FIG. 12 can be used with the arm configurations of FIGS. 1-11 and 13-15. In addition, the specific arm configurations are exemplary and different numbers of arms can be provided. Toys 2 can be used as a fetch toy that can be thrown and retrieved, as a chew toy upon which a pet directly chews, as a tug of war toy wherein the pet holds one arm and the owner holds another arm, or as a chew toy holder or holder for an edible item.

The pet toy 2 configurations of FIGS. 1-16 include at least one arm 4 that projections outwardly (an example is a radial projection) from a central hub 6 that supports a flexible retainer 8 which can be provided in the form of a plurality of inwardly-projecting resilient fingers 8. Configurations with two and three arms 4 are disclosed while other configurations include those with four to six arms. In the exemplary configurations, arms 4 project in a common reference plane but in other configurations, arms 4 can project in different planes relative to each other. For example, some arms 4 can project upwardly away from hub 6 and some arms 4 can project downwardly away from hub 6. The end of each arm can have an enlarged end having a height that is larger than a height of a middle portion of the arm. The pet toy 2 configurations of FIGS. 17-19 include central hub 6 that can be thrown by the user. FIG. 17 provides central hub 6 in a rounded ball shape. FIG. 18 provides central hub 6 in an elongated ball shape. FIG. 19 provides central hub in the shape of a flying disc. All of the configurations of pet toy 2 can be thrown as a fetch toy for a pet such as a dog.

In the exemplary configurations, arms 4 and central hub 6 are fabricated from a tough material that can withstand aggressive chewing from a large dog. One such material is nylon which can be molded with or without flavoring. An example is available from Honeywell Resins and Chemicals in Morristown, N.J. under the Federal Trademark Registration AEGIS (product number H8202NLB). Nylons such as these are moldable and have desired mechanical properties to provide durable chew toys for aggressive-chewing dogs. Arms 4 and hub 6 can have a Rockwell hardness of from about 90 R to 130 R. In other configurations, arms 4 and hub 6 can be fabricated from other tough materials or combinations of materials suitable for use with a pet toy such as rubber, polymers, bone, ceramics, and fiber-based materials.

Figure 16:
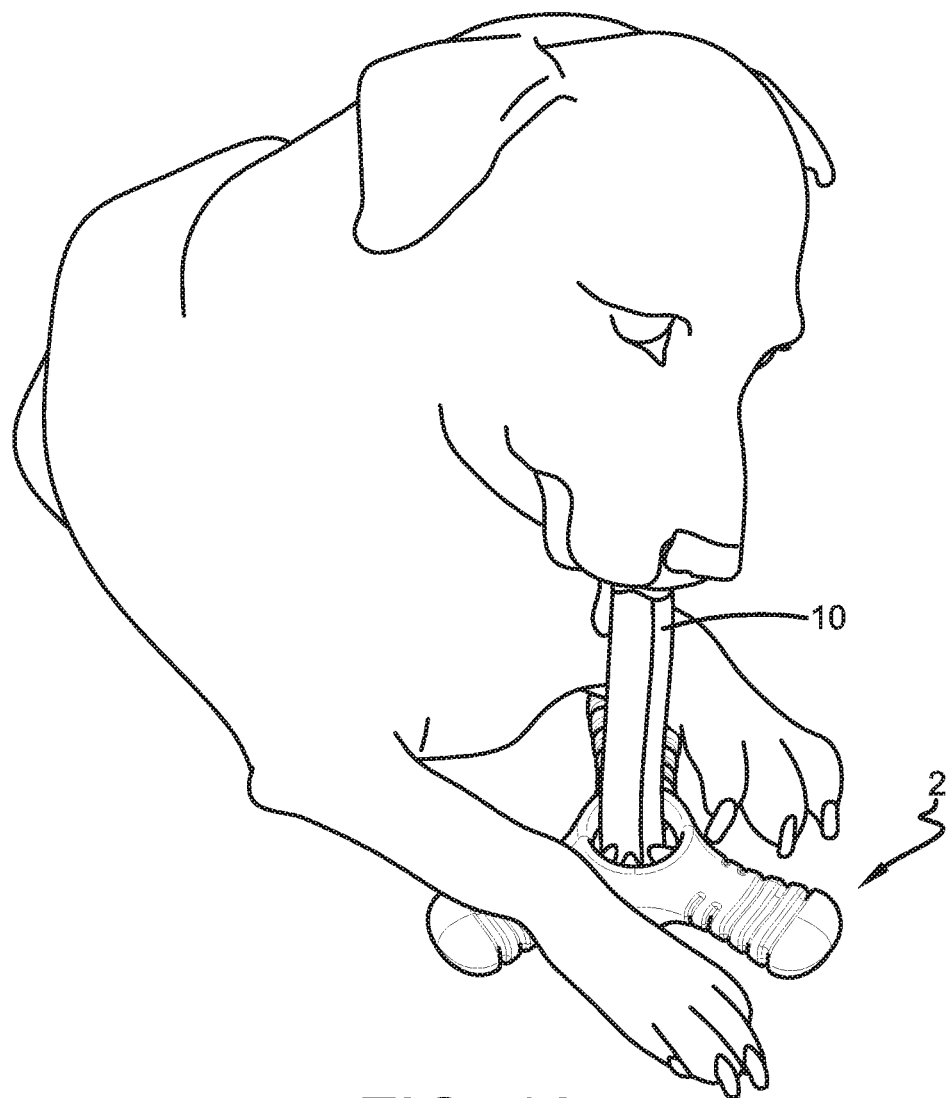
FIG. 16 is a perspective view of an exemplary use of the pet toy.

Resilient fingers 8 can be made from a moldable polymer or a rubber. Fingers 8 can be molded directly over central hub 6 and can thus fuse together if overmolded before hub 6 fully cures. Overmolding within an hour can provide some fusing between the materials. Pet toy 2 also can be made by sandwiching upper lower portions of arms and hub about an inner portion of fingers and welding the nylon arms and hub together. Resilient fingers 8 can have a Shore A hardness in a range of 30 to 90. Fingers 8 can be bent at least thirty degrees (bent in a direction up out of the plane of the paper in FIG. 2 as a reference direction) in order to be resilient as the term in used in this application. Fingers that can bend ninety-degrees without breaking can be provided. Fingers 8 are bendable so an additional chew toy 10 such as a bully stick, a raw hide stick, another nylon stick, or a fiber-based stick can be pushed through pet toy 2 and resiliently held for the use of the pet as shown in FIG. 16 (FIG. 16 depicts the bent fingers).

In one configuration, fingers 8 are secured without an adhesive. Fingers 8 are supported by and project radially-inwardly from a ring-shaped base 20 (FIG. 9) that is molded over an anchoring rib 22 that projects inwardly from an inner surface 24 of hub 6. Anchoring rib 22 can be continuous or provided in spaced sections. In another configuration, fingers 8 and ring-shaped base 20 can be molded separate from hub 6 and stretched and snapped into place after both are cured. In this configuration, an adhesive can be used. Anchoring rib 22 is dovetailed so that base 20 has portions that are directly between the outer end of rib 22 and inner surface 24 to provide a secure connection. The upper 26 and lower 28 edges of base 20 are disposed well inwardly of the upper 30 and lower 32 rims of hub 6 to protect base 20 from a chewing pet. Upper 26 and lower 28 edges can be spaced from upper 30 and lower 32 rims by at least fifty percent of the height of base 20 (between edges 26 and 28). Upper 30 and lower 32 rims are smoothly rounded.

At the location of each finger 8, a support stud 40 projects inwardly from ring-shaped base 20. A resilient finger 8 is formed over each support stud 40. Each support stud projects to about a quarter to two-thirds the length of finger 8 to allow finger 8 to bend to accept chew 10 as described above. Each support stud 40 can be dovetailed, threaded, or ribbed to provide a secure connection. Each stud 40 can be round, square, oval, triangular or a combination of shapes. Each stud 50 can have a flat side facing one side of the mold and a rounded side facing the other side of the mold for improved mold release.

Figure 10:
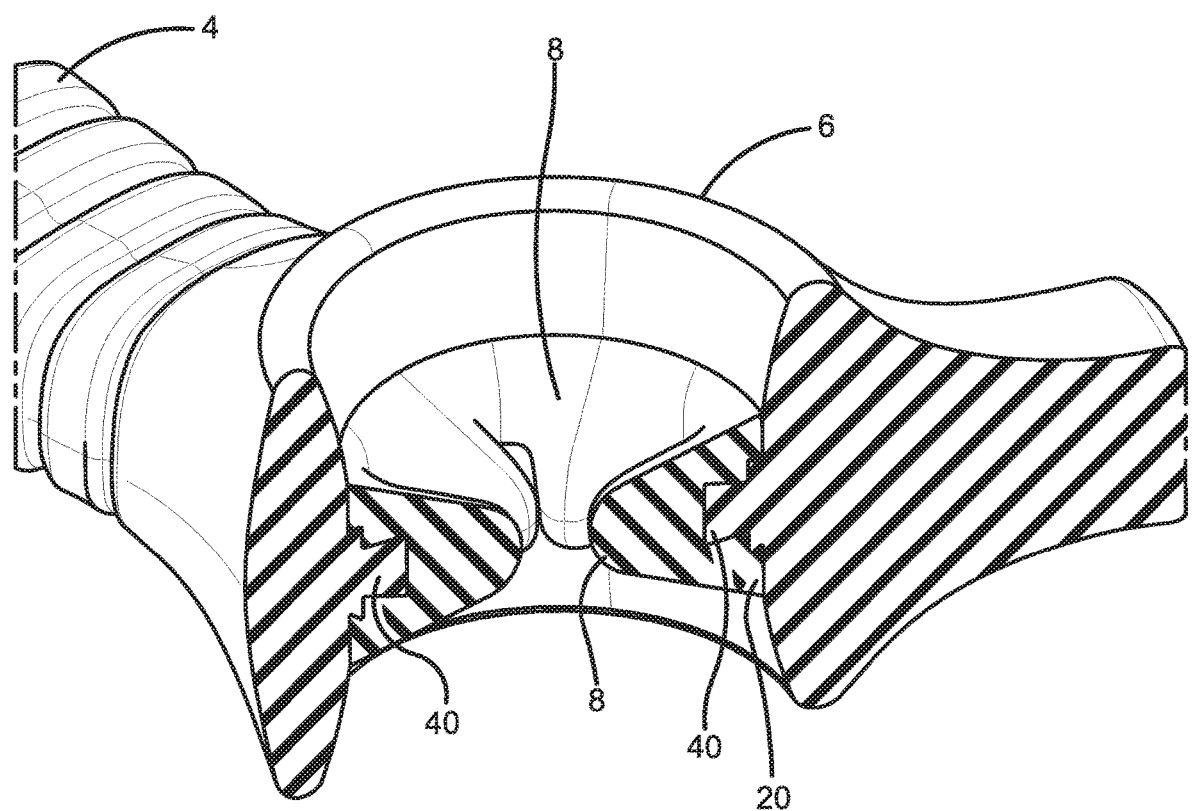
FIG. 10 is a section view similar to FIG. 9 taken through two of the resilient fingers.
Figure 11:
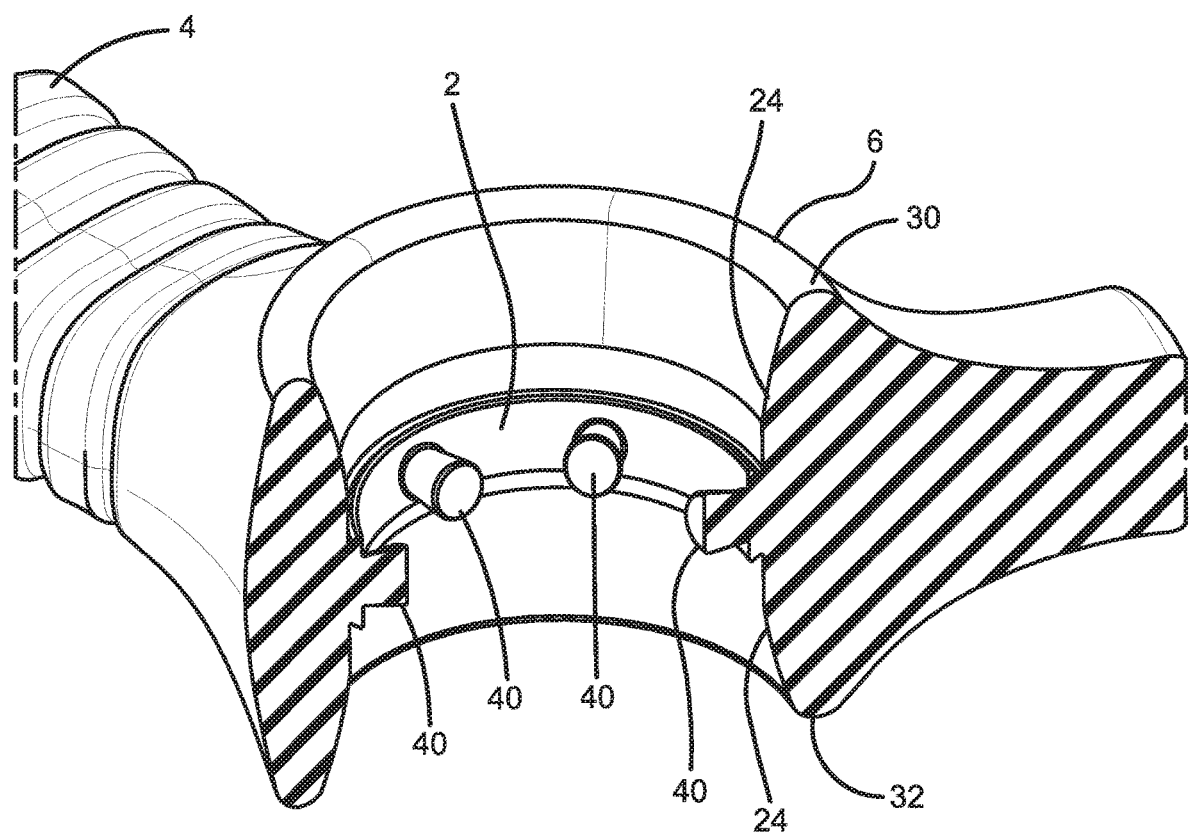
FIG. 11 is a section view similar to FIG. 10 with the resilient fingers removed.

As shown in FIG. 10, each finger 8 is generally triangular in cross section with a rounded inner tip.

Figure 1:
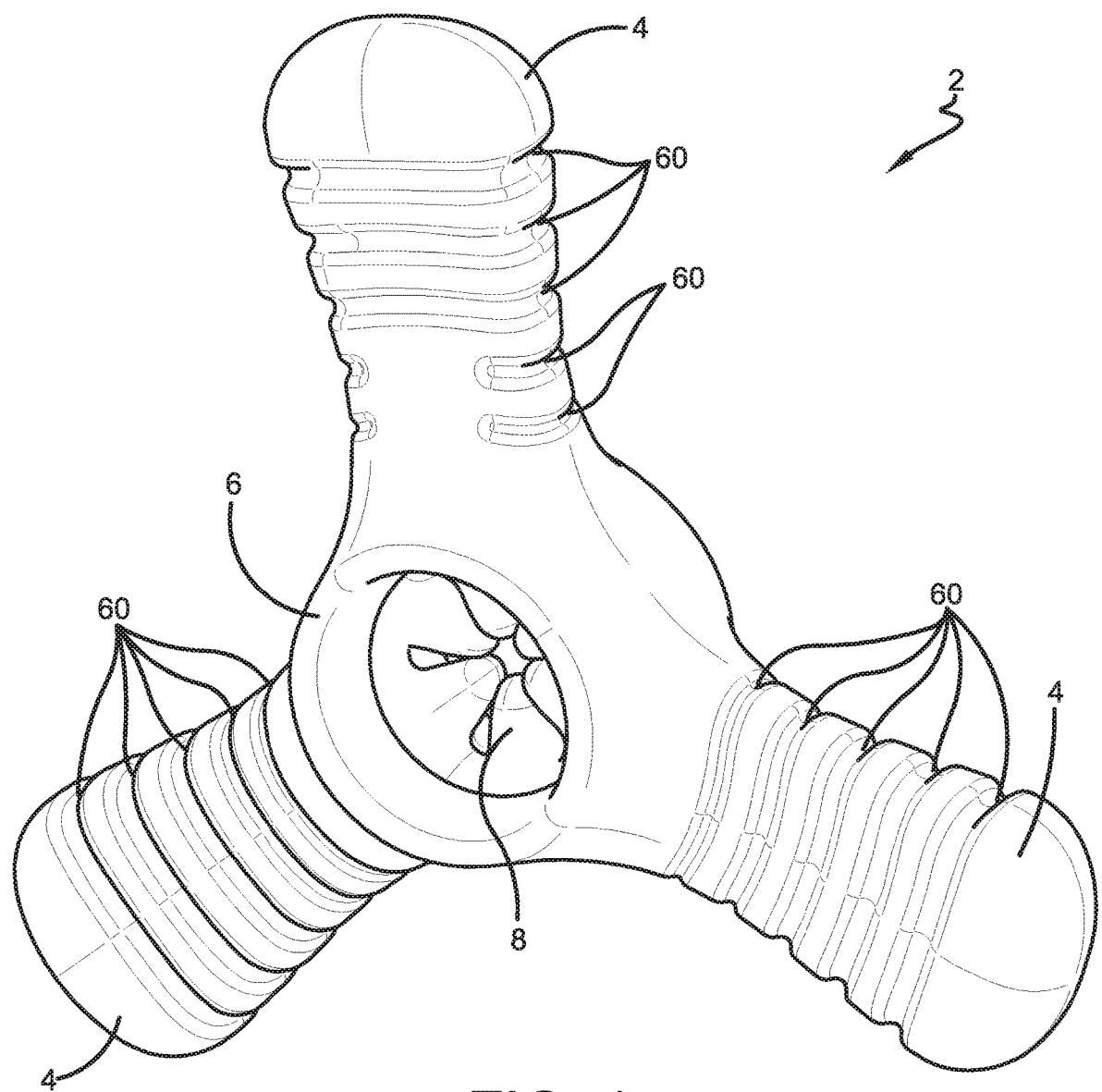
FIG. 1 is a perspective view of an exemplary configuration for the pet toy.
Figure 2:
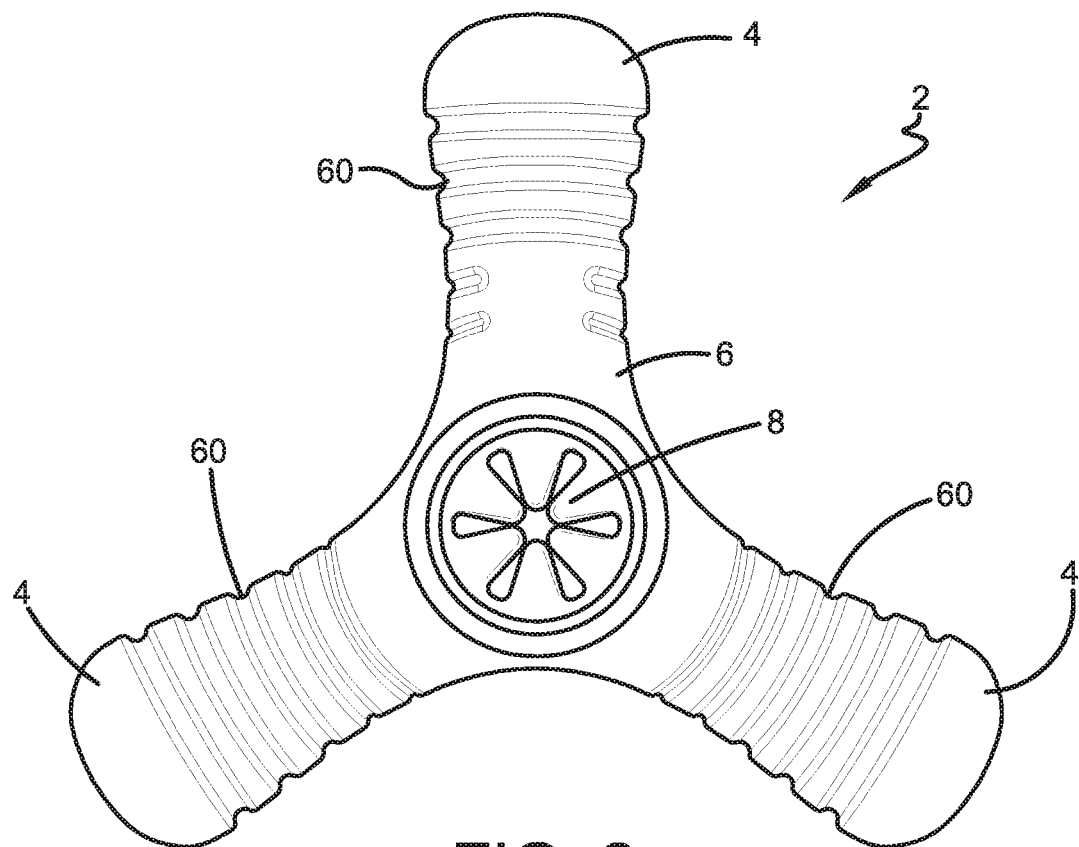
FIG. 2 is a top plan view of FIG. 1.
Figure 3:
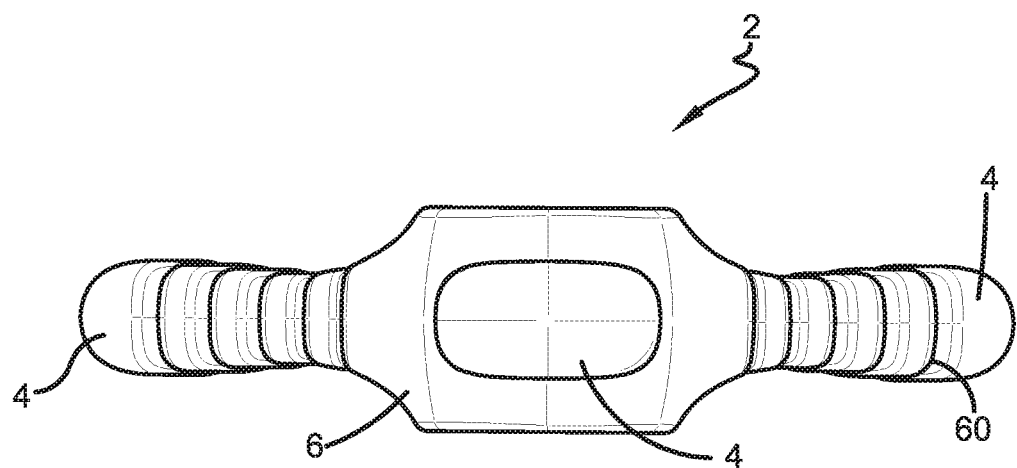
FIG. 3 is a front elevation view of FIG. 1 showing the outer wall of the central hub extending both above and below the arms.
Figure 4:
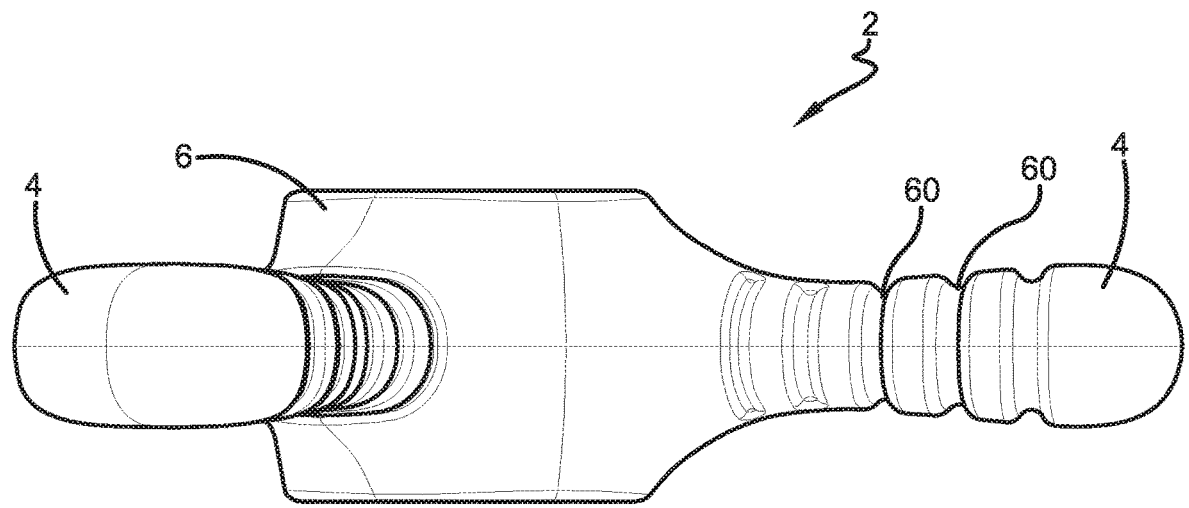
FIG. 4 is a left side view also showing the outer wall of the central hub extending both above and below the arms.
Figure 5:
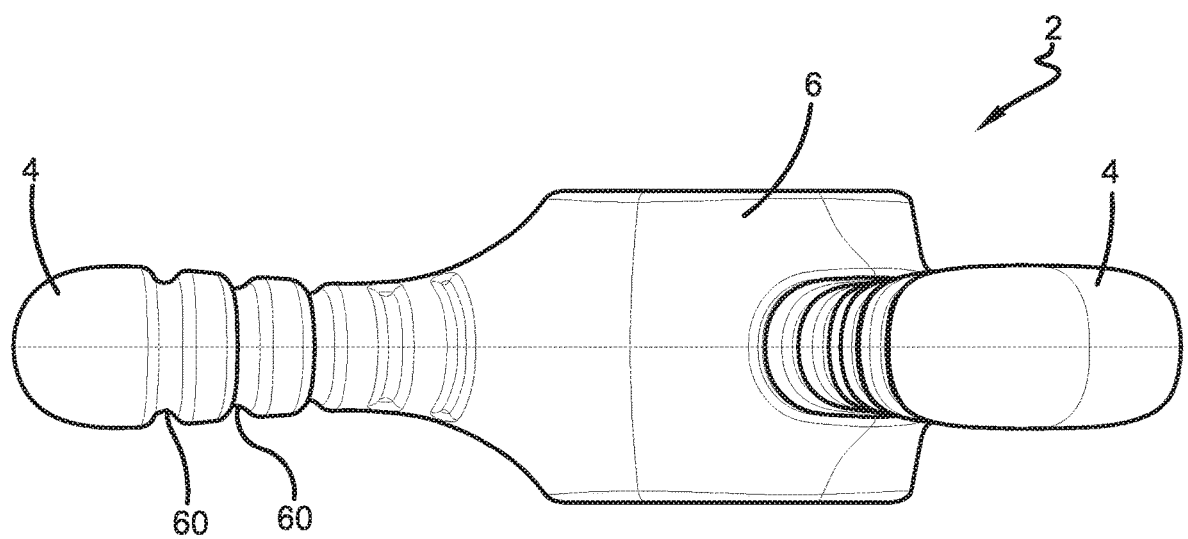
FIG. 5 is a right side view also showing the outer wall of the central hub extending both above and below the arms.
Figure 6:
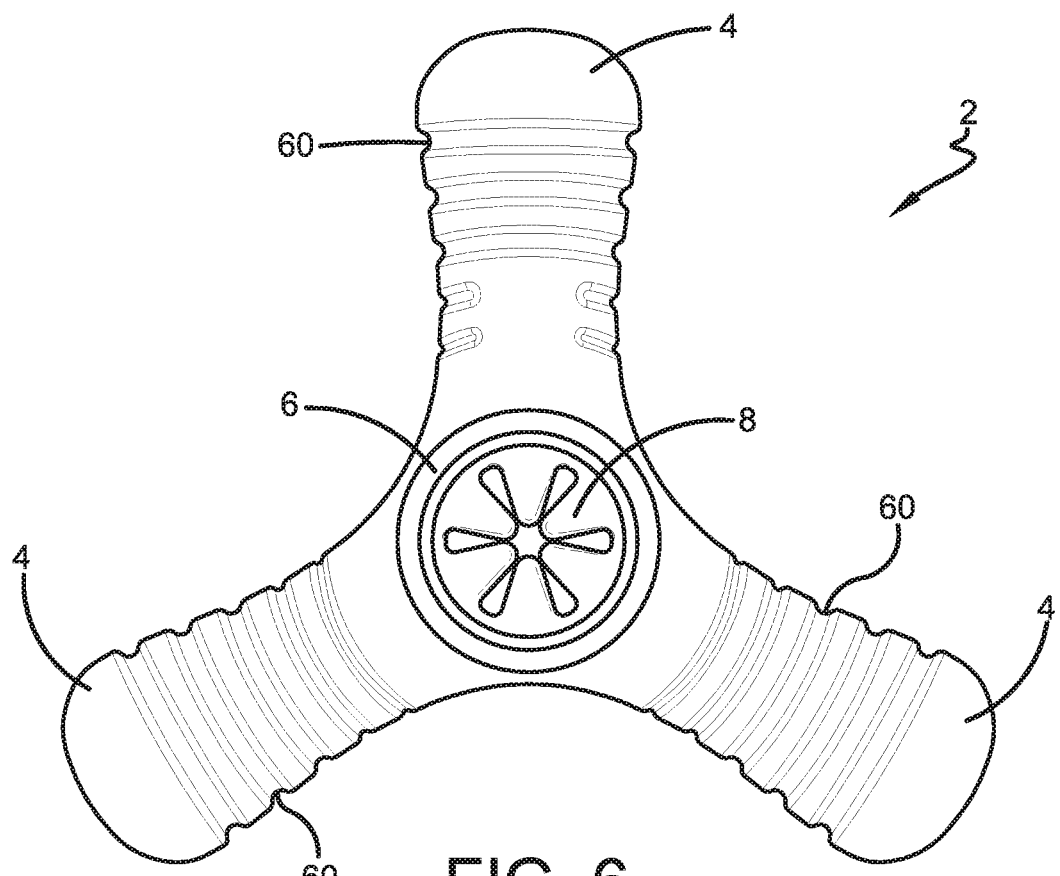
FIG. 6 is bottom plan view of FIG. 1.
Figure 7:
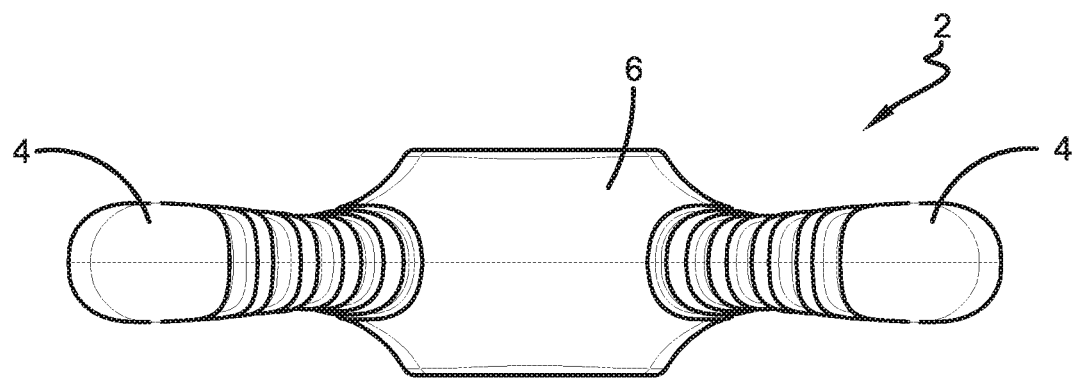
FIG. 7 is a rear elevation view of FIG. 1 also showing the outer wall of the central hub extending both above and below the arms.
Figure 8:
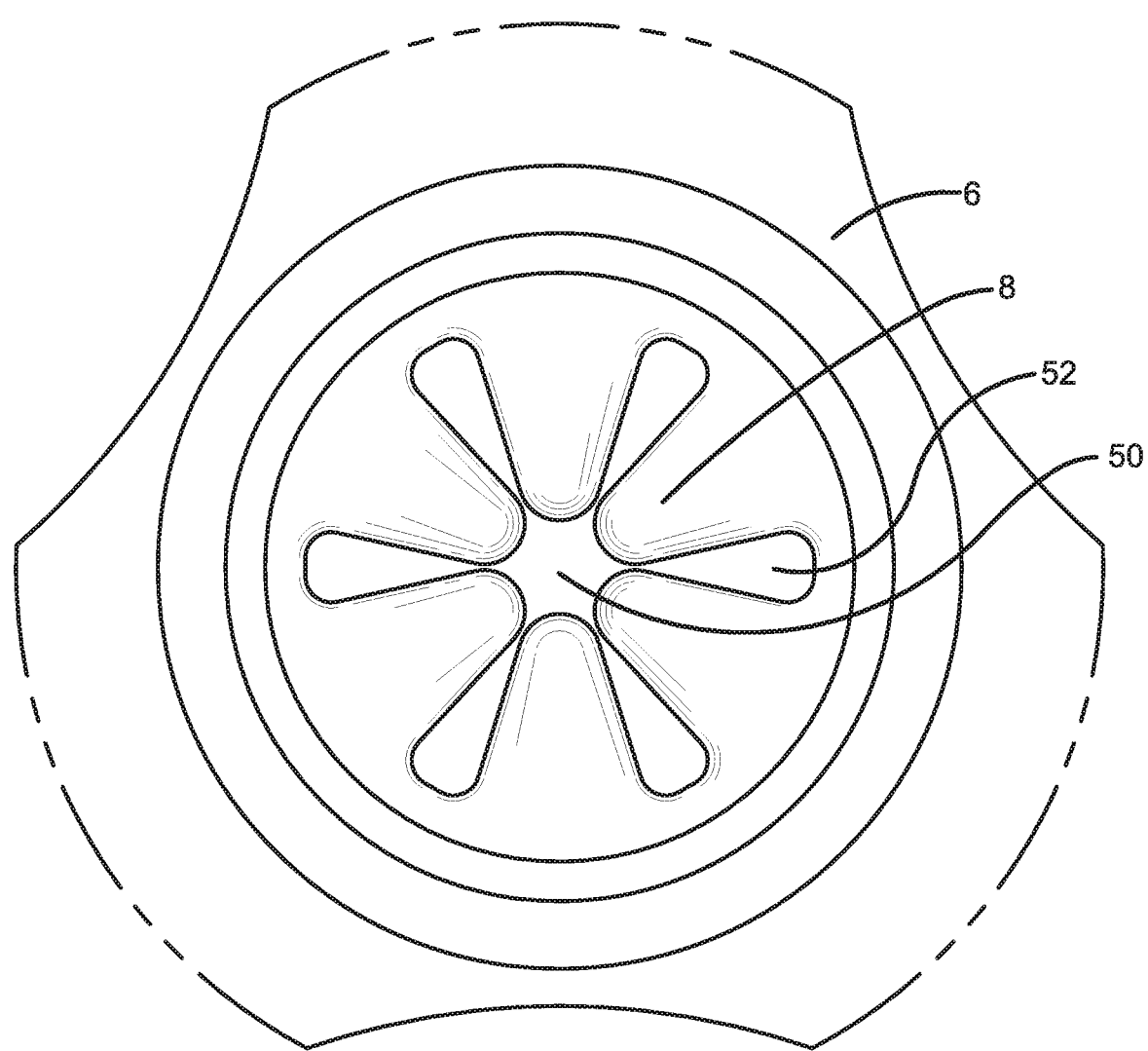
FIG. 8 is an enlarged top plan view of the resilient fingers and central hub portion of the pet toy.

In the first and third exemplary configuration, six fingers 8 project inwardly with fingers 8 configured to having tips that tangentially touch (FIG. 2) or almost touch (within less than a quarter inch as shown in FIG. 8) to define a central opening 50 and six tapered slots 52 that receive items 10 for a pet to chew open while item 10 is being held by toy 2. Opening 50 can be used for bully sticks, raw hide sticks, or other nylon sticks which tapered slots 52 can be used with flatter items such as jerky sticks. Fingers 8 can be bent to a bent configuration as shown in FIG. 16 to provide a resilient holding force for item 10.

Figure 12:
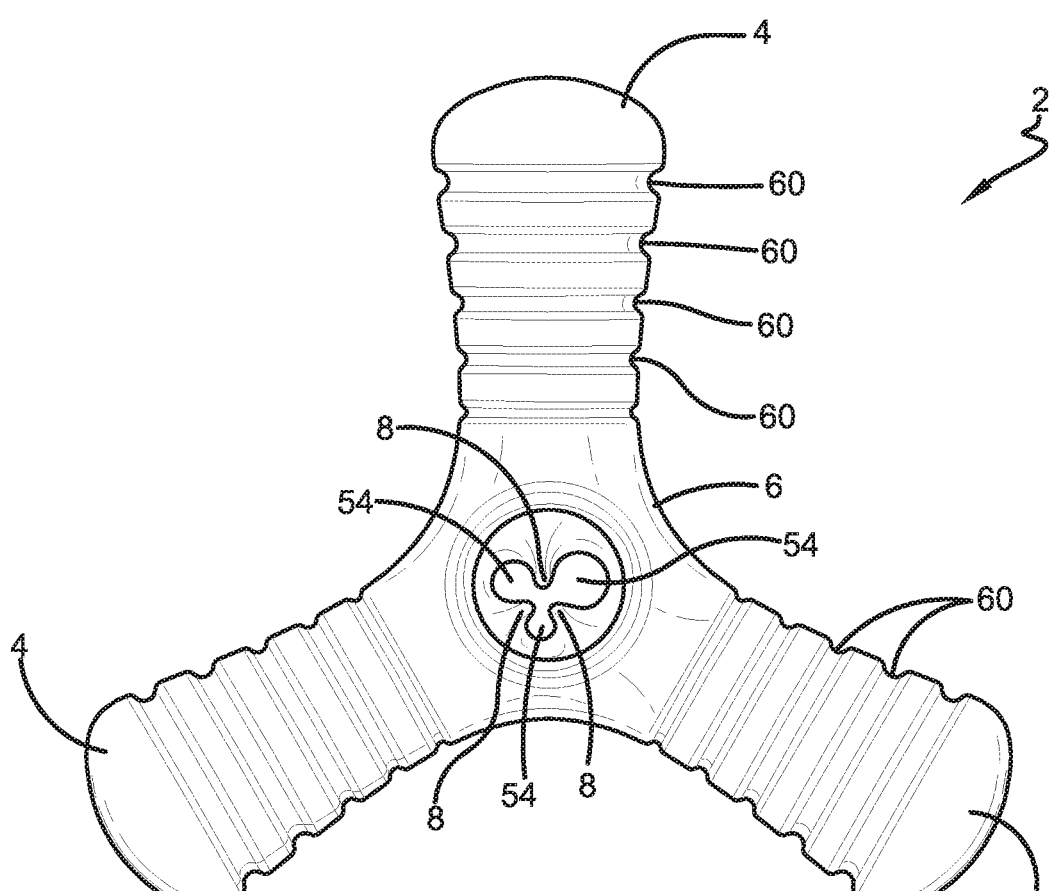
FIG. 12 is a top plan view of another exemplary configuration for the pet toy.

An alternative configuration for retainer 8 is depicted in FIG. 12 wherein three different sized openings 54 are defined. Openings 54 are different sizes for different items.

Arms 4 are generally tapered from enlarged outer ends to smaller necked-down areas where they join hub 6. Arms 4 can be provided with ribs 60 that can be protruding or indented as shown in the drawings. Indented ribs 60 allow provide recesses for the pet's teeth and claws. The indented ribs 60 are smoothly curved. Ribs 60 can extend entirely about the circumference of arms 4 or be provided as partial ribs.

Figure 9:
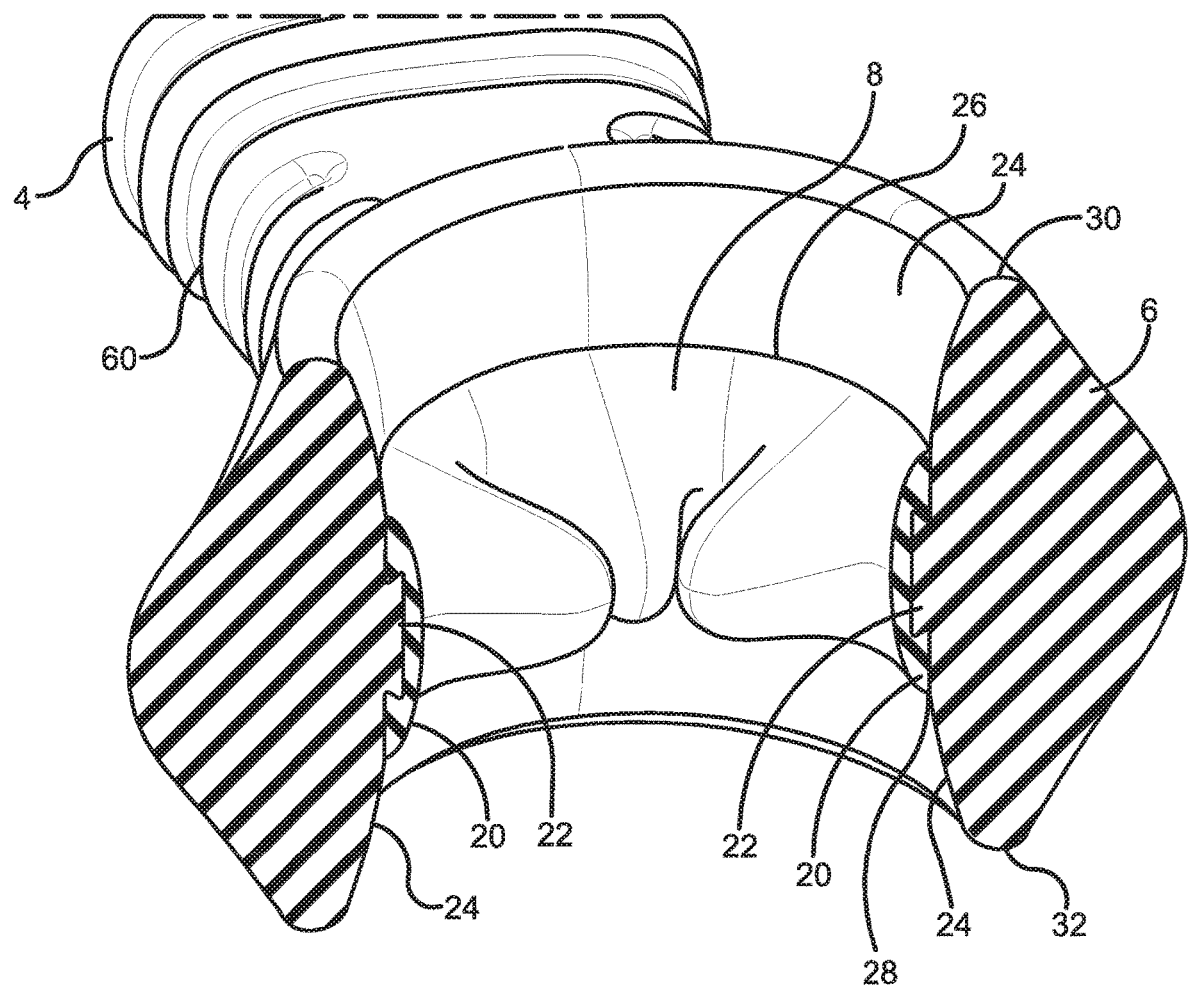
FIG. 9 is a section view taken through the central hub depicting an exemplary configuration of the connection between the resilient fingers and the central hub.

Arms 4 project from central portions of hub 6 both below upper rim 30 and above lower rim 32 (see FIG. 9). This arrangement allows the pet to push down on one or two arms 4 to cause the other arm 4 to pivot up away from the ground to provide for easier chewing. This configuration also allows the pet to position item 10 into a desirable angle for chewing. The necked portion of each arm 4 can be about half the height of hub 6 with the enlarged end being half to three-quarters the height of hub 6. The enlarged ends of arms 4 are smoothly rounded.

As described above, hub 6 provides for tilting and the protection of fingers 8. In the third exemplary configuration, the outer surface of hub 6 can be provided as a portion of a sphere or substantially rounded (FIG. 14) to allow pet toy 2 to be rolled along the ground.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A pet toy comprising:
   a central hub having an upper rim and a lower rim; the central hub defining an opening extending through the central hub;
   a plurality of arms projecting away from the central hub;
   a flexible retainer carried by the central hub and projecting into the opening;
   the flexible retainer including a plurality of flexible fingers projecting into the opening;
   the flexible retainer including a ring-shaped base connected to the central hub; the plurality of flexible fingers projecting inwardly from the ring-shaped base; and
   the central hub including an anchoring rib; the ring-shaped base of the flexible retainer disposed over the anchoring rib to connect the flexible retainer to the central hub.

2. The pet toy of claim 1, wherein the anchoring rib is dovetailed in cross section.

3. The pet toy of claim 2, wherein the flexible retainer is molded over the anchoring rib to connect the flexible retainer to the central hub.

4. The pet toy of claim 1, wherein the central hub has an inner surface; portions of the ring-shaped base disposed directly between the inner surface of the central hub and the anchoring rib.

5. The pet toy of claim 1, further comprising a support stud projecting from the anchoring rib into each of the flexible fingers.

6. The pet toy of claim 1, wherein the ring-shaped base has an upper edge and a lower edge and a height defined between the upper and lower edges; the upper edge of the ring-shaped base being spaced from the upper rim of the central hub by a distance that is at least fifty percent of the height of the ring-shaped base; and the lower edge of the ring-shaped base being spaced from the lower rim of the central hub by a distance that is at least fifty percent of the height of the ring-shaped base.

7. The pet toy of claim 1, wherein the plurality of flexible fingers and the plurality of arms are disposed in a common reference plane.

8. The pet toy of claim 1, wherein the upper and lower rims of the central hub are rounded.

9. The pet toy of claim 1, wherein each of the arms defines a plurality of grooves.

10. The pet toy of claim 9, wherein the grooves are parallel to define ribs between the grooves.

11. The pet toy of claim 1, wherein the plurality of arms and central hub comprise nylon; the flexible retainer comprises rubber.

12. The pet toy of claim 1, wherein each of the arms has an enlarged end.

13. A pet toy comprising:
    a central hub having an upper rim and a lower rim; the central hub defining an opening extending through the central hub;
    a flexible retainer carried by the central hub and projecting into the opening;
    the flexible retainer includes a ring-shaped base connected to the central hub;
    the ring-shaped base has an upper edge and a lower edge and a height defined between the upper and lower edges;
    the upper edge of the ring-shaped base being spaced from the upper rim of the central hub by a distance that is at least fifty percent of the height of the ring-shaped base;
    the lower edge of the ring-shaped base being spaced from the lower rim of the central hub by a distance that is at least fifty percent of the height of the ring- shaped base; and
    the central hub including an anchoring rib; the ring-shaped base of the flexible retainer disposed over the anchoring rib to connect the flexible retainer to the central hub.

14. The pet toy of claim 13, wherein the flexible retainer includes a plurality of flexible fingers projecting into the opening defined by the central hub; the plurality of flexible fingers projecting inwardly from the ring-shaped base.

15. The pet toy of claim 14, wherein the central hub has an inner surface; portions of the ring-shaped base disposed directly between the inner surface of the central hub and the anchoring rib.

16. The pet toy of claim 15, further comprising a support stud projecting from the anchoring rib into each of the flexible fingers.

17. The pet toy of claim 13, wherein the upper rim is continuous about a top of the central hub; the lower rim being continuous about a bottom of the central hub.

* * * * *